July 25, 1933.   O. RODHE   1,919,861
APPARATUS FOR ANALYZING THE GASEOUS CONTENT IN LIQUIDS
Filed March 26, 1932

Inventor
Olof Rodhe

By Knight Bros.
Attorneys

Patented July 25, 1933

1,919,861

UNITED STATES PATENT OFFICE

OLOF RODHE, OF RAHLSTEDT, HAMBURG, GERMANY, ASSIGNOR TO SVENSKA AKTIEBOLAGET MONO, OF STOCKHOLM, SWEDEN

APPARATUS FOR ANALYZING THE GASEOUS CONTENT IN LIQUIDS

Application filed March 26, 1932, Serial No. 601,421, and in Germany March 3, 1931.

This invention relates to an improvement in apparatus for the analyzing of gases contained in liquids.

In the use of liquids in industry, particularly of water in steam boilers, there arises the problem of maintaining the liquid free from the slightest quantities of gases in solution. This requirement is of great consequence in steam generation, where a gas content of 0.5 cc. of oxygen in a liter of water which comes in contact with the metal parts is sufficient to attack those metal parts, and particularly the boiler. Great care has been exercised in steam generating plants to exclude air from the water which is supplied to the boiler and in many cases the water is purified before use. The determination of the gaseous content of the water only by means of the usual gas analysis methods employed heretofore not only requires a trained personnel in order to obtain correct results, but also involves a great loss of time.

It is an object of the invention to make possible the automatic continuous analysis of liquids for their content of dissolved gases in order to obtain a continuous supervision of the water. Thereby water which, by reason of its gas content, destroys the metal parts may be excluded.

According to the invention, a definite amount of liquid is warmed in a so-called degassing or purifying tank in order to free the dissolved gases. Thereby advantage is taken of the fact that liquids in general at higher temperatures are capable of taking up less quantities of gases than at lower temperatures and that at a definite temperature the liquid is able to hold a corresponding minimum amount of the dissolved gas. The freed gas accumulates in a space provided above the level of the liquid and is then lead to the analyzing apparatus where the gas constituents are intermittently analyzed in accordance with requirements.

It is a further object of the invention to conduct the gas freed from the liquid to the analyzing apparatus with the aid of a neutral scavenging or cleaning gas. The scavenging gas is preferably passed through the heated liquid and takes along with it the remainder of the gas present in the liquid.

The invention will be best understood by reference to the accompanying drawing which illustrates an embodiment thereof.

Figure 1:
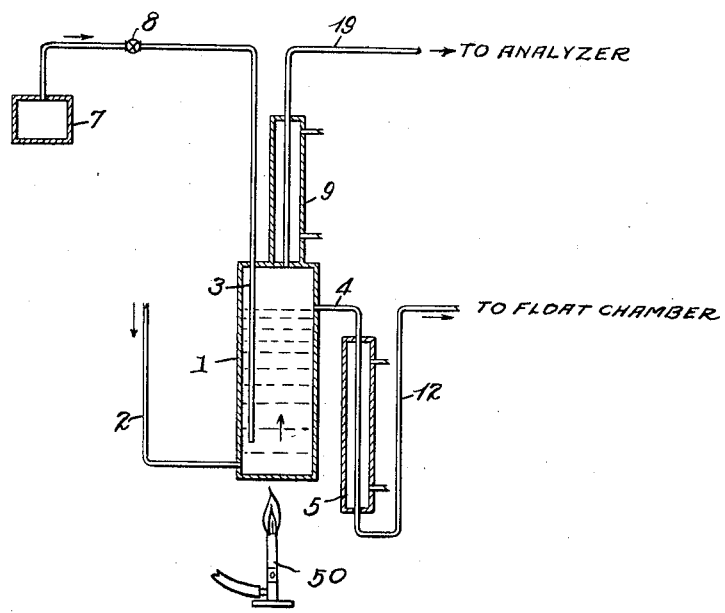
Figure 2:
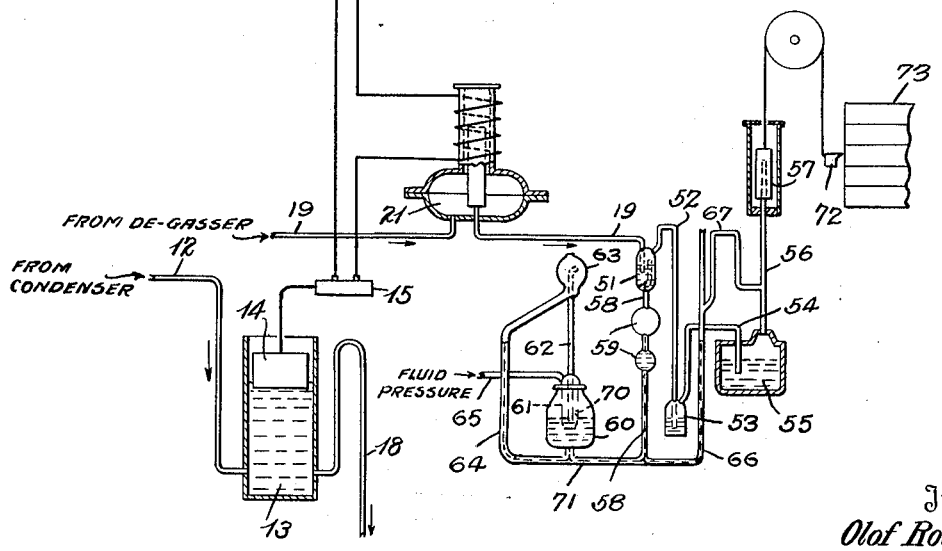

Fig. 1 is a schematic showing in section of one form of the de-gassing portion of my improved apparatus, and Fig. 2 is a sectional view of the measuring and analyzing portion thereof.

In Fig. 1 the de-gassing tank is designated at 1. Into this tank connects the pipe 2, which continually introduces the liquid to be analyzed, for example water. This water if not sufficiently hot already to discharge its dissolved gases when the pressure on it is reduced, is heated to its boiling point by means of a suitable heating apparatus 50. Thereby the gases contained in the water are rendered free and accumulate in the space 3. 4 is a pipe to lead off the purified water. 5 is a cooler surrounding said pipe having suitable inlet and outlet ports for the cooling medium. This cooler serves to condense the steam generated in the de-gassing tank.

A container for the scavenging gas, for example hydrogen, is indicated at 7, which is connected to the purifying tank 1 through a tube controlled by the valve 8. A tube 19 connects the space 3 with the analyzing apparatus. A cooler 9 surrounds pipe 19 and is provided with suitable inlet and outlet ports for the cooling medium. The purpose of cooler 9 is to completely free the gases leaving the space 3 from steam and moisture.

Fig. 2 illustrates the measuring and analyzing apparatus connected with the de-gassing apparatus shown in Fig. 1, whereby a definite proportion between the volume of water introduced into the de-gassing tank and the quantity of gas lead through the space 3 from the de-gassing tank to the analyzing apparatus is automatically maintained. The lead-off pipe 12 for the purified water running from the de-gassing tank 1 through cooler 5 (Fig. 1) leads to a tank 13 (Fig. 2) wherein is disposed a float 14 which controls the intermittent operation of the analyzer. In the pipe 19 leading from the de-gasser to the analyzer is inserted a magnetic valve 21. The circuit of this valve is opened and closed by a mercury switch 15 operated by the float 14 in chamber 13. The analyzer to which pipe 19 leads may be of conventional design, for instance of the form shown in my prior patent, No. 1,351,129. The pipe 19 terminates in a liquid seal chamber 51 from which the gas mixture is conveyed by a pipe 52 through another liquid seal chamber 53 and a pipe 54 to an absorption chamber 55. This chamber contains a liquid capable of absorbing one or more of the constituents of the gas mixture and releasing the other constituents to pass up through tube 56 into a measuring bell 57.

The gas mixture is pumped to the analyzing apparatus by means of a mercury pump operated by fluid pressure. For this purpose, there is connected to the gas space of the liquid seal chamber 51, a pipe 58 in which are inserted measuring vessels 59. The bottom of this pipe is connected to a mercury chamber 60 in the mouth of which is supported capsule-shaped chamber 61. Rising through and above the chamber 61 is a vertical pipe 62 opening at its upper end into an open top receiving funnel 63, the bottom of which merges into a return tube 64 communicating with the bottom of mercury chamber 60. The chamber 61 is connected by a pipe 65 to a source of fluid pressure of at least 10 pounds per square inch. There is, furthermore, a hole 70 by which chamber 61 communicates with the mercury vessel 60. The bottom of tube 58 is also connected to a riser 66 communicating through a by-pass 67 with tube 56. In starting, the chambers 60 and 61 and the several communicating risers connected thereto are filled with mercury to the levels indicated. The pressure fluid entering chamber 61 through pipe 65 depresses the mercury in chambers 60 and 61. From chamber 61 the mercury passes up through tube 62, while the mercury in chamber 60 passes down through the common pipe 71 at the bottom and up in the several risers 58, 64, and 66. As the mercury rises in tube 58 it evacuates the gas in the upper measuring vessel 59, the gas passing out through pipe 52, chamber 53, and pipe 54 into the absorption chamber. The evacuation of measuring vessel 59 delivers a measured quantity of gas mixture into the absorption chamber 55. One or more constituents of the gas mixture being absorbed in this chamber, the remainder of the mixture passes through pipe 56 into the measuring bell 57, which is raised in accordance with the proportion between the gas absorbed, or the gas remaining unabsorbed, and the whole quantity of gas mixture represented by the volume of the upper measuring vessel 59. The movement of measuring bell 57 operates a stylus 72 which records the movement on a chart 73. The rising of the mercury in tube 58 is accompanied by the rising of mercury from chamber 61 in tube 62 and the operation is terminated by the emptying of chamber 61 to the bottom of tube 62 and the overflow of the mercury into funnel 63, which opens chamber 61 to the atmosphere and relieves the pressure. The mercury returns to chamber 60 through pipe 64. Mercury rising in tube 66 seals the by-pass 67 during the absorbing and measuring process, but when the pressure is relieved by the discharge of mercury from tube 62, the mercury in tube 66 drops below the outlet of by-pass 67, thereby opening the interior of measuring bell 57 to the atmosphere and allowing the bell to drop. At the same time, the mercury recedes from measuring vessel 59, thereby preparing for the drawing in of a new charge of gas mixture upon the opening of valve 21. The mercury returned to chamber 60 raises the level until it is slightly above hole 70 and the mercury then flows into chamber 61, sealing the bottom of tube 62 again.

The apparatus, as a whole operates as follows:

Should it be desired to determine the content of oxygen and carbon dioxide in water, a definite amount of water, V cc. per minute, is introduced into the de-gassing tank 1, and as previously mentioned, it is heated by a suitable heat source 50 to 100° C. Thereby the dissolved gases in the water such as oxygen, carbon dioxide, and nitrogen are freed and accumulate in the space 3 of the tank. These gases are sucked out of the space 3 by the gas analyzing apparatus when the valve 21 is opened. At the same time, an amount of neutral gas, for instance hydrogen, sufficient to make up a definite quantity of gas mixture corresponding to the volume of measuring vessel 59 is supplied through the open connection between container 7 and the de-gassing tank 1. For this purpose the vessel 59 will obviously be made of sufficient volume to contain all the gas driven out of the quantity of water on the basis of which the measurement is made, plus a considerable amount of neutral scavenging gas. Since the quantities of gas contained in the water are small and the quantity of water measured for each sample may be as small as necessary, there is no difficulty in providing a vessel 59 of suitable proportions corresponding to standard gas analyzing apparatus. The pressure of the gas in container 7 acting through valve 8 serves to maintain the correct pressure in the de-gassing tank so that the quantity of gas sucked in by the pump will be constant. The sucking up of the gases is effected after definite periods of time of $t$ seconds.

It is advisable to provide a seal between the container for the hydrogen and the gas accumulation space 3. For this reason the hydrogen is passed through the water in the de-gassing tank, which has the further advantage that the gases present in the water are practically replaced by the scavenging gas. The gas mixture is then analyzed in the gas analyzing apparatus in known manner for its oxygen and carbon dioxide content.

The water to be tested flows through pipe 2 into de-gassing tank 1 at a constant rate. The overflow passes through pipe 4 into cooler 5, thence through pipe 12 into float chamber 13. Assuming the float 14 to be at its lowermost position, de-gassed water coming from the pipe 12 gradually raises the float 14 as chamber 13 fills up. When the float 14 reaches a certain height it closes mercury switch 15 and operates magnetic valve 21. The opening of the valve 21 results in the transfer of another quantity of gas from the de-gassing tank 1 to the absorption apparatus, in the manner previously explained. When the level in float chamber 13 reaches a certain height, the siphon 18 comes into operation and empties the float chamber. The siphon discharge pipe 18 is of sufficient size so that the flow of water out of the float chamber during the period of discharge is more rapid than the flow of water into the same, and during the discharge the float sinks until it reaches its lowest level when the siphon is broken. As the floats sinks, the switch 15 is opened, allowing valve 21 to close again.

Having described my invention, I claim:

1. Apparatus for determining the gas content of a liquid, comprising a de-gassing tank having an inlet and an outlet for the liquid, means for heating the liquid to be de-gassed in said tank, intermittently operating gas analyzing apparatus adapted to draw in a measured quantity of gas at each operation, a gas conduit connecting said analyzing apparatus with said de-gassing tank, means for introducing a neutral scavenging gas into said de-gassing tank at a definite pressure, volumetric liquid measuring means operated by the liquid flowing through said de-gassing tank, and means operated by said liquid measuring means for starting a flow of gas to be analyzed from said de-gassing tank, through said conduit, into said analyzing apparatus.

2. Apparatus for determining the gas content of a liquid, comprising a de-gassing tank having an inlet and an outlet for the liquid, means for heating the liquid to be de-gassed in said tank, intermittently operating gas analyzing apparatus adapted to draw in a measured quantity of gas at each operation, a gas conduit connecting said analyzing apparatus with said de-gassing tank, means for introducing a neutral scavenging gas into said de-gassing tank at a definite pressure, a float chamber connected to the liquid outlet of said de-gassing tank, said float chamber having a siphon discharge pipe adapted periodically to discharge said float chamber, said discharge pipe being of sufficient size so that the flow of water out of said float chamber during the period of discharge is more rapid than the flow of water into the same, and a control device operated by the float of said float chamber for starting a flow of gas to be analyzed from said de-gassing tank, through said conduit, into said analyzing apparatus.

OLOF RODHE.